United States Patent Office 3,323,995
Patented June 6, 1967

3,323,995
METHOD OF INHIBITING THE CROSSLINKING OF FIBRIN IN BLOOD
Laszlo Lorand, Evanston, Ill., assignor to Northwestern University, Evanston, Ill., a corporation of Illinois
No Drawing. Filed May 20, 1963, Ser. No. 281,795
5 Claims. (Cl. 167—65)

This invention relates to a new class of blood coagulation inhibitors and more particularly to a method of using such inhibitors to prevent the crosslinking or polymerization of fibrin to avoid or delay the coagulation of blood and to minimize the formation of blood clots.

The actual clotting phase in the blood coagulation of vertebrates is initiated by two parallel sets of reactions catalyzed by thrombin. In all instances, there occurs an activation of prothrombin to thrombin followed by the conversion of fibringen into a fibrin gel by the simultaneous scission of fibrinopeptide fragments from the parent clotting protein. The fibrin gel thus formed is soluble in 30% aqueous urea or 1% aqueous monochloroacetic acid. In the presence of calcium ions, fibrin stabilizing factor when incubated with thrombin becomes activated, and the activated fibrin stabilizing factor proceeds in the presence of calcium ions to polymerize the urea soluble fibrin gel into a crosslinked blood clot which is insoluble in 30% aqueous urea or 1% aqueous monochloroacetic acid.

It has now been discovered that the presence of certain glycine derivatives during the polymerization of fibrin by activated fibrin stabilizing factor will strongly inhibit the crosslinking process. These derivatives do not interfere with the onset of gelation or clotting time when added to vertebrate blood but specifically delay the appearance of the mechanically stronger, urea-insoluble character of the clot. In lobster blood plasma which contains no prothrombin to form thrombin, these derivatives act as inhibitors of cloting itself or cause a great delay in cloting time. Thus, the method hereinafter described in extremely useful as a laboratory tool in studying the coagulation of blood in vertebrates including humans and provides a vital step in understanding the complex mechanism of blood clotting which so often occurs in thromboembolic disorders.

In essence, the invention comprises contacting blood with a small but effective amount of glycine methyl ester, glycineamide or glycylglycine methyl ester so that during the final stage of blood clotting the polymerization or crosslinking of fibrin into an acid- or urea-insoluble blood clot is inhibited. The most effective range of these compounds in inhibiting the polymerization of fibrin has been found to be about 5 to 25 millimoles per liter of blood. However, higher or lower amounts may be employed if desired with good results and without adverse effects. The preferred range is from 5 to 10 millimoles of glycine derivative per liter of blood. It is to be understood that the higher the concentration of the inhibitor, the greater the inhibition observed. Of the three compounds disclosed as inhibitors, glycine methyl ester is preferred since it is the most effective.

To test the effectiveness of the glycine compounds as inhibtors of fibrin crosslinking, fibrin stabilizing factor prepared as described in J. Biol. Chem., 236, 2625 (1960) was activated by thrombin and the latter was then inactivated followed by the admixing of fibrin and one of the herein disclosed inhibitors. The polymerization which occurred was then determined by the amount of acid-or urea-insoluble clot residues formed. The exact, analytical procedure employed is more specifically set forth in the following examples which are intended to illustrate rather than limit the invention.

Example 1

An aqueous buffer solution was first prepared containing 0.05 molar tris(hydroxymethyl) aminomethane and adjusted to a pH of 7.5 with hydrochloric acid and 0.1 molar aqueous sodium chloride. Next, an activation mixture containing 0.5 ml. of one millimolar calcium chloride, 0.5 ml. of 0.1 molar cysteine, 0.4 ml. of fibrin stabilizing factor and 0.1 ml. of thrombin was dissolved in the buffer first prepared and the resulting solution incubated for 10 minutes at 20° C. The thrombin activity was then inactivated by the addition of 0.2 ml. of a 0.25 molar solution of N-α-tosyl-L-arginine methyl ester in the same buffer. Two minutes later, 0.5 ml. of glycine methyl ester dissolved in the tris buffer first prepared was added in various concentrations ranging from 1 to 20 millimolar in separate test tubes. Clotting was intitated three minutes later by the addition to each test tube of 0.3 ml. of a solution containing 1.5% purified bovine fibrin dissolved in one molar aqueous sodium bromide and adjusted to a pH of 5.4. Thirty minutes after clotting, 2.5 ml. of 2% aqueous monochloroactic acid was added to each test tube and the acid insoluble residues remaining after 24 hours were washed and analyzed for protein content. The control sample with no inhibitor was found to contain about 3 mg. of acid insoluble residue. The sample with 2 millimolar glycine methyl ester added contained about 2 mg. of acid insoluble residue which was reduced to 1 mg. at an inhibitor concentration of 3 millimolar. At a concentration of 5 millimolar or more of glycine methyl ester, it was found that the amount of acid insoluble residue was negligible.

Example 2

The same procedure described in Example 1 was employed except that glycineamide was substituted for the glycine methyl ester. Substantially the same results were obtained in that the amount of acid insoluble clot residue was negligible at concentrations of 5 millimoles or more of inhibitor per liter of blood.

Example 3

In another series of tests, the procedure described in Example 1 was followed except that glycylglycine methyl ester was employed as the crosslinking inhibitor. At a concentration of 5 millimolar, there was present about one mg. of acid insoluble clot residue which continued to diminish at higher concentrations and was substantially nil at 20 millimoles of inhibitor per liter of blood.

Example 4

Freshly drawn human blood (0.8 ml.) was mixed in glass tubes (a) with 0.1 ml. each of 0.2 molar aqueous glycineamide and 0.15 molar aqueous sodium chloride solution and (b) with 0.1 ml. each of 0.2 and 0.15 molar aqueous sodium chloride solution. Clotting occurred in both samples within 7 minutes after the blood was drawn. The samples were then incubated at 37° C. The blood clot in the presence of glycineamide dissolved in 24 hours whereas the control blood clot in the absence of glycineamide showed no evidence of dissolving after the same period of incubation. Comparable results are obtained with the blood of rabbits, rats and humans when glycine methyl ester and glycylglycine methyl ester are substituted for glycineamide as the fibrin crosslinking inhibitor.

What is claimed is:

1. A method of inhibiting the crosslinking of fibrin in vertebrate blood which comprises contacting blood with a small but effective inhibiting amount of a compound selected from the group consisting of glycine methyl ester, glycineamide and glycylglycine methyl ester.

2. A method as claimed in claim 1 in which the compound employed as an inhibitor of fibrin crosslinking is present in a concentration of from 5 to 25 millimoles per liter of blood.

3. A method as claimed in claim 2 in which the compound employed is glycine methyl ester.

4. A method as claimed in claim 2 in which the compound employed is glycineamide.

5. A method as claimed in claim 2 in which the compound employed is glycylglycine methyl ester.

References Cited

Newcomb: The New England Journal of Medicine, vol. 260, No. 11, pp. 545–548, March 1959

Shapiro: Scientific American, vol. 84, pp. 18–21, March 1951.

ALBERT T. MEYERS, *Primary Examiner.*

SAM ROSEN, *Examiner.*

LEROY B. RANDALL, *Assistant Examiner.*